(12) United States Patent
Chen et al.

(10) Patent No.: US 11,763,161 B2
(45) Date of Patent: Sep. 19, 2023

(54) ENHANCED RESOLUTION IN SEMICONDUCTOR FABRICATION DATA ACQUISITION INSTRUMENTS USING MACHINE LEARNING

(71) Applicant: Tokyo Electron Limited, Tokyo (JP)

(72) Inventors: Yan Chen, Cupertino, CA (US);
Xinkang Tian, San Jose, CA (US);
Zheng Yan, Pleasonton, CA (US)

(73) Assignee: Tokyo Electron Limited, Tokyo (JP)

( * ) Notice: Subject to any disclaimer, the term of this patent is extended or adjusted under 35 U.S.C. 154(b) by 630 days.

(21) Appl. No.: 16/820,032

(22) Filed: Mar. 16, 2020

(65) Prior Publication Data

US 2020/0292388 A1 Sep. 17, 2020

Related U.S. Application Data

(60) Provisional application No. 62/819,115, filed on Mar. 15, 2019.

(51) Int. Cl.
*G01J 3/28* (2006.01)
*G01J 3/02* (2006.01)
(Continued)

(52) U.S. Cl.
CPC ............ *G06N 3/084* (2013.01); *G01J 3/0275* (2013.01); *G01J 3/2823* (2013.01);
(Continued)

(58) Field of Classification Search
CPC ...... G01J 3/2823; G01J 3/0275; G06N 20/00; G06N 3/08; G06V 10/50; G06K 9/6232; G06K 9/6257
See application file for complete search history.

(56) References Cited

U.S. PATENT DOCUMENTS 5,450,205 A 9/1995 Sawin et al.
6,885,467 B2 4/2005 Du-Nour et al.
(Continued)

FOREIGN PATENT DOCUMENTS

KR 10-2018-0057420 A 5/2018
WO WO 2018/044904 A1 3/2018

OTHER PUBLICATIONS

Wang, Yifan, et al. "A fully progressive approach to single-image super-resolution." Proceedings of the IEEE conference on computer vision and pattern recognition workshops. 2018. (Year: 2018).*
(Continued)

*Primary Examiner* — Markus A. Vasquez
(74) *Attorney, Agent, or Firm* — Oblon, McClelland, Maier & Neustadt, L.L.P.

(57) ABSTRACT

A data set is stored in memory circuitry that is indicative of a state of a semiconductor fabrication process or of semiconductor structure fabricated thereby. Features in the data set are discernable to an extent limited by a data resolution. A machine-learning model comprising parameters having respective values assigned thereto as constrained by a model training process is also stored in the memory circuitry. Processor circuitry communicatively coupled to the memory circuitry generates an output data set from the data set in accordance with the machine-learning model such that features in the output data set are discernable to an extent limited by an output data resolution that is finer than the data resolution of the data set.

12 Claims, 8 Drawing Sheets

(51) Int. Cl.
  *G06N 20/00*   (2019.01)
  *G06F 18/213*  (2023.01)
  *G06F 18/214*  (2023.01)
  *G06V 10/44*   (2022.01)
  *G06N 3/084*   (2023.01)
  *G06N 3/08*    (2023.01)
  *G06V 10/82*   (2022.01)

(52) U.S. Cl.
  CPC ........ *G06F 18/213* (2023.01); *G06F 18/2148* (2023.01); *G06N 3/08* (2013.01); *G06N 20/00* (2019.01); *G06V 10/454* (2022.01); *G06V 10/82* (2022.01)

(56) References Cited

U.S. PATENT DOCUMENTS

| | | | |
|---|---|---|---|
| 7,149,262 | B1 | 12/2006 | Nayar et al. |
| 8,108,328 | B2 | 1/2012 | Hench |
| 9,151,670 | B1* | 10/2015 | Mitchell ............... G01J 3/0208 |
| 10,102,444 | B2 | 10/2018 | Kim et al. |
| 10,438,825 | B2 | 10/2019 | Jain et al. |
| 2004/0080761 | A1* | 4/2004 | Du-Nour ............ G01B 11/0625 356/630 |
| 2010/0017351 | A1 | 1/2010 | Hench |
| 2015/0106316 | A1* | 4/2015 | Birdwell ................ G06N 3/063 706/33 |
| 2017/0102269 | A1* | 4/2017 | Zhu .................... G02B 26/0816 |
| 2018/0136118 | A1* | 5/2018 | Kueny ................ H05H 1/0006 |
| 2018/0144209 | A1 | 5/2018 | Kim et al. |
| 2019/0186990 | A1* | 6/2019 | Oana ..................... G01J 3/0256 |
| 2020/0090304 | A1* | 3/2020 | Leem ................... G06T 3/4046 |
| 2020/0193290 | A1* | 6/2020 | Cho ....................... G06N 3/045 |

OTHER PUBLICATIONS

Wikipedia. Convolutional neural network. Article dated Mar. 6, 2019. https://en.wikipedia.org/w/index.php?title=Convolutional_neural_network&oldid=886523035#Convolutional_layer. Accessed Jul. 27, 2022. (Year: 2019).*

Paoletti, Mercedes E., et al. "Deep pyramidal residual networks for spectral-spatial hyperspectral image classification." IEEE Transactions on Geoscience and Remote Sensing 57.2 (2018): 740-754. (Year: 2018).*

Yair Rivenson, et al., "Deep Learning Microscopy", Optica vol. 4, No. 11, Nov. 2017, p. 1437-1443.

Yair Rivenson, et al., "Deep Learning Microscopy: Supplemental Material", Optica, Nov. 20, 2017, p. 1-8.

International Search Report and Written Opinion dated Jul. 6, 2020 in PCT/US2020/022746, 10 pages.

Han, D., et al., "Deep Pyramidal Residual Networks", CVF, Retrieved from the internet: http://arxiv.org/abs/1610.02915, Sep. 6, 2017, pp. 5927-5935.

International Preliminary Report on Patentability dated Sep. 30, 2021 in PCT/US2020/022746, 7 pages.

* cited by examiner

ENHANCED RESOLUTION IN SEMICONDUCTOR FABRICATION DATA ACQUISITION INSTRUMENTS USING MACHINE LEARNING

RELATED APPLICATION DATA

This application claims benefit of priority under 35 U.S.C. § 119(e) from U.S. Provisional Patent Application No. 62/819,115 entitled "Deep-learning Enhanced Spectrometer Resolution Techniques," filed Mar. 15, 2019, the entire disclosure of which is incorporated herein by reference.

BACKGROUND

Field of the Disclosure

The present disclosure relates to the techniques for imaging and spectral resolution improvement for images and spectral data used to monitor semiconductor treatment processes or features formed on semiconductor substrates. In particular, the disclosure provides novel techniques for applying low resolution image or spectral data to a trained artificial neural network to generate a high resolution image or spectral data.

Background Art

Broadband compact spectrometers are widely used in semiconductor plasma etching processes to collect optical emission spectra for various process control purposes, such as end-point detection. The spectrometer system's signal-to-noise ratio (SNR) defines the quality of information on which the control signals are generated. The SNR is usually highly proportional to the throughput of the spectrometer. Typically, a spectrometer's performance is quantified by a few critical parameters including: spectral bandwidth. i.e., the detectable wavelength range; spectral resolution, i.e., the resolvable finest spectral feature; optical throughput, i.e., the percentage of light collected by the detector.

A higher resolution spectrometer will typically sacrifice throughput and spectral (wavelength) range to obtain high resolution results. Likewise, a spectrometer designed for higher throughput and broader spectral range will typically have lower resolution. The ability to resolve finer details within the spectrum data while maintaining throughput and spectral range of a low resolution spectrometer is not currently available in most high resolution spectrometers, particularly where cost of the instrument is a limiting design factor. Many spectrometer designs available today include tradeoffs among the design-critical parameters. A simple and effective way of improving the spectral resolution is to use a narrower slit as the spectrometer entrance, which effectively narrows the "image" of each wavelength of the diffracted spectrum on a charge-coupled device (CCD) detector; however, it comes at the cost of reduced light, and corresponding information, that passes through the slit. The tradeoff between resolution and throughput is very hard to overcome by a physical spectrometer design alone.

SUMMARY

One object of the present disclosure is to mitigate the above-described tradeoff with physical design parameters associated with conventional spectrometers.

Another object of the present disclosure is to enable use of a low resolution spectrometer to collect spectral data and be able to resolve finer details within the spectral data or images without sacrificing throughput or spectral range.

In one aspect of the present inventive concept, an apparatus is provided that includes memory circuitry that stores a data set indicative of a state of a semiconductor fabrication process or of semiconductor structure fabricated thereby. Features in the data set are discernable to an extent limited by a data resolution. The memory circuitry also stores a machine-learning model comprising parameters having respective values assigned thereto as constrained by a model training process. Processor circuitry is communicatively coupled to the memory circuitry and generates an output data set from the data set in accordance with the machine-learning model such that features in the output data set are discernable to an extent limited by an output data resolution that is finer than the data resolution of the data set.

DETAILED DESCRIPTION

Figure 1:
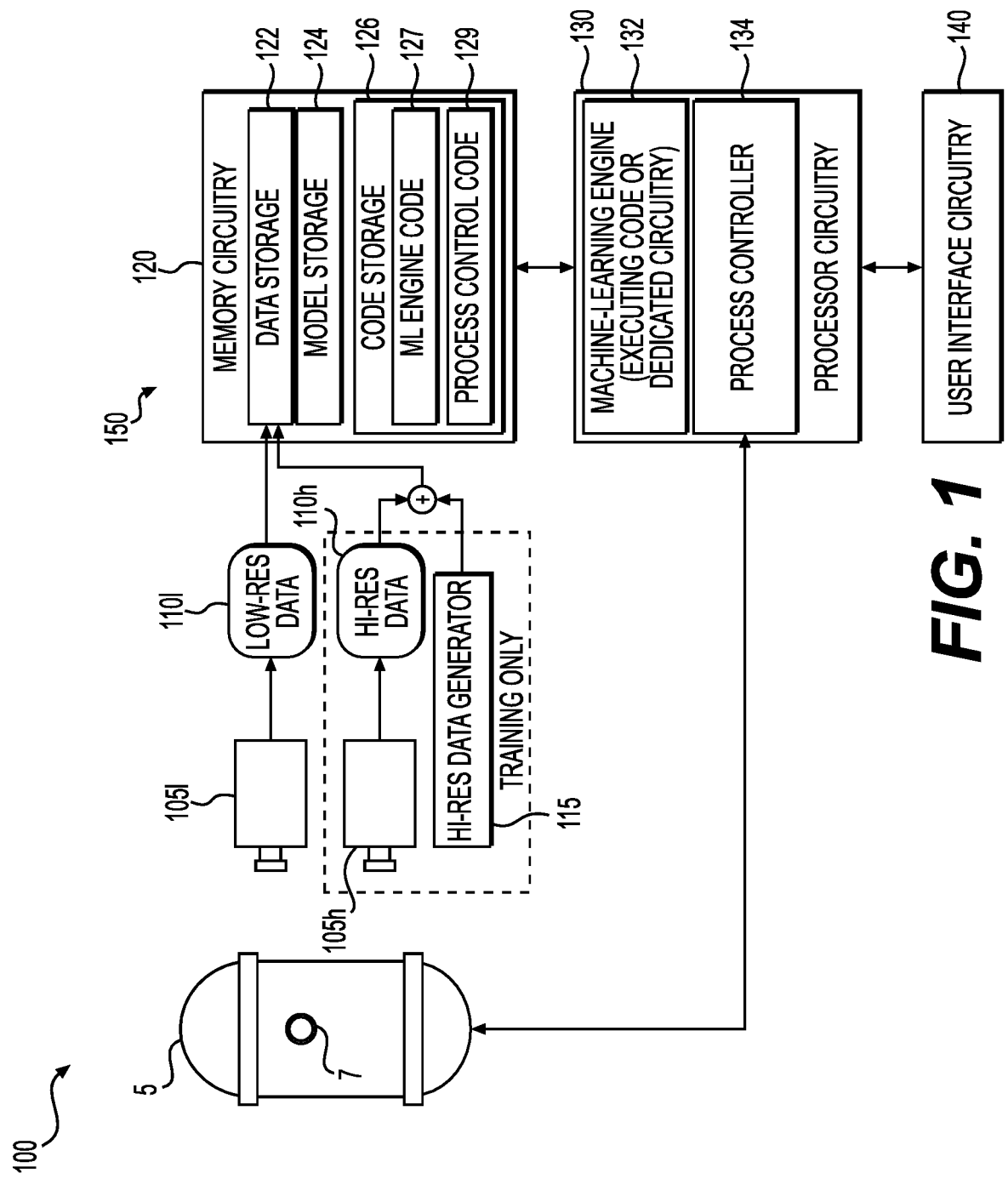
FIG. 1 is a schematic block diagram of an example system in which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

The word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

This disclosure relates to "building" or generating a high-resolution (HR) data set from data collected by a low resolution (LR) spectrometer or image capturing device. In other words, techniques disclosed herein enable an HR spectrometer to operate with an extended wavelength range and a high light throughput of an LR spectrometer. Further, variations of a similar technique may be used to generate higher resolution image data from a lower resolution images.

The invention described herein incorporates deep learning techniques with relatively low resolution spectral data, collected by, for example, a conventional optical spectrometer design, to acquire higher resolution data using a predictive model built on analysis of paired low resolution and high resolution data sets (e.g., empirical or simulated) associated with a semiconductor process or features on a semiconductor substrate. In this way, high resolution data of semiconductor processes or substrate features can be acquired with lower cost hardware and faster cycle time than using existing relatively higher resolution spectrometers or imaging systems and techniques. For example, in the spectral embodiment, the critical criteria for defining the quality of a spectral data set includes bandwidth (i.e., the detectable wavelength range), resolution (i.e., the resolvable finest spectral feature), and optical throughput (i.e., the percentage of light collected by the detector). In most instances, the aforementioned elements are balanced against each other by physical design tradeoffs of the spectrometer to achieve predictable and meaningful results (e.g., patterns, features, or process conditions) for semiconductor manufacturing in the shortest possible amount of time. For example, obtaining higher resolution spectrometer data sets is achieved at the expense of higher throughput and wavelength range. Accordingly, it would be advantageous to obtain higher resolution data without making those sacrifices. In addition to the spectral embodiment, deep learning techniques may be applied to other low resolution data (e.g., images) to decipher higher resolution information or characteristics of the semiconductor process or substrate features being analyzed.

One approach to achieve this advantageous capability is to construct a machine-learning (ML) model capable of producing high resolution data sets from lower resolution data sets. Ideally, the model-generated high resolution data can provide information, which is not readily discernible from the low resolution data unless such low resolution data is processed by the ML model. The ML model may be prepared by analyzing low and high resolution training data, either collected experimentally or by simulation, to determine a statistical transformation or relationship which can be used to train an artificial neural network (ANN), such as a convolutional neural network (CNN). For example, a CNN of several layers may be trained to statistically relate low resolution data to high resolution data about a process or feature. The low and high resolution data may be collected on similar or slightly different processes or features to improve the robustness of the statistical relationship between the data sets. In this way, the ML model is developed to accurately predict high resolution results and may be optimized by comparing the modeled results with actual high resolution data. After validating the accuracy and precision of the model, the trained network may be applied to low resolution data to generate corresponding high resolution data or results related to the semiconductor processes or features. Two spectrometers may be used to generate the corresponding low and high resolution data sets representative of the process or substrate features. However, in other embodiments, the low and high resolution data sets may be generated by simulation of measured spectra to approximate actual process conditions. In this way, the simulated spectral data may be optimized to simulate specific characteristics of a spectrum based on known or observed phenomena, such that a training data set may include entirely simulated low and high data sets, a combination of simulated and experimental training pairs, or training pairs that include simulated and experimental data.

FIG. 1 is a schematic block diagram of an example system 100 in which the present inventive concept can be embodied. For purposes of description and not limitation, system 100 may be constructed or otherwise configured for semiconductor fabrication wherein much of the fabrication processing occurs in one or more sealed chambers, representatively illustrated at chamber 5. Chamber 5 may include one or more ports, representatively illustrated at port 7, by which processes occurring inside chamber 5 can be monitored, including by spectroscopy, optical imaging, or other techniques known to skilled artisans. Such interior processes may include material deposition and etching, both of which may utilize plasma that is of process-dependent constitution. The constituents within chamber 5 can be evaluated by, for example, spectroscopy. Other processes can be monitored or inspected by way of optical or electronic imaging. As will be recognized by skilled technicians upon review of this disclosure, embodiments of the present inventive concept implement techniques that are applicable to spectrographic, optically-acquired imagery and other acquired imagery.

System 100 may include a processor 150 comprising memory circuitry 120 by which data and processor instruction code are stored, processor circuitry 130 by which data and control processes are executed and user interface circuitry 140 by which a human user interfaces system 100 for purposes of, among other things, data analysis and control. As illustrated in FIG. 1, memory circuitry 120 may be constructed or otherwise configured to store data sets, such as in data storage location 122, machine learning models, such as in model storage location 124, and processor instruction code, such as in code storage location 126. Processor instruction code may include ML engine code (when the ML engine is not hardwired in dedicated circuitry), such as in ML engine code storage location 127 and process control code, such as in process controller code storage location 129. Processor circuitry 130 may be constructed or otherwise configured to execute the processor instruction code stored in memory circuitry 120, such as is illustrated at ML engine 132 and process controller 134.

System 100 may further comprise data acquisition mechanisms, representatively illustrated at data acquisition instruments 105*l* and 105*h*. As indicated above, the present invention can be embodied to increase resolution in a variety of different data types and, as such, instruments 105*l*, which represents a low-resolution data acquisition instrument producing low-resolution data 110*l*, and 105*h*, which represents a high-resolution data acquisition instrument producing high-resolution data 110*h*, represent any number of devices that can be used to collect application-specific data, e.g., image data, spectral data, etc. It is to be understood that while the description that follows is primarily directed to spectral data sets, other data may be used in embodiments of the invention.

Experimental or simulated data may be collected or generated under various conditions or variables to establish or define a predictable relationship between the low and high resolution data sets 110*l* and 110*h*. The relationship may be based on a common element between the process conditions, feature type, or detection technique. However, the relationship may also be assigned based on differences or dissimilar elements between data sets 110*l* and 110*h* (e.g., device setting/configuration (slit size, field of view, aperture size)). In fact, data sets 110*l* and 110*h* may be collected or generated along a variety of device setting/configuration options to obtain a resolution distribution for the observed process condition or features. The training relationship may group one or more low resolution data sets 110*l* to one or more high resolution data sets 110*h* related to process condition characteristics, which may include, without being limited to, chemical composition, temperature, density, and/or energy or signal associated with the process. Additionally, the relationships may extend to process conditions being implemented in chamber 5 (e.g., set points) that may include, but are not limited to, temperature, pressure, gas flow rate, applied power, applied voltage, rotation speed, translation speed, liquid dispense rate, liquid dispense volume. Further, the process condition may include a range of results arranged as a distribution or profile for the respective characteristic. In addition to process conditions, the spectral data may be representative of one or more features on a substrate. In this instance, the feature characteristics may include, but are not limited to thickness, width, height, orientation, roughness, flatness, angle, coverage, alignment, and/or a geometric profile of the feature. Additionally, the feature characteristic may refer to an area, distance between features, or orientation of features to one another (e.g., overlap of features, exposed area, alignment). Any of the above applications in which experimental or simulated LR and HR data sets are generated may be used to train an artificial neural network using the techniques described herein.

System 100 may be operated in two (2) operational modes: a training mode, in which a machine-learning model is configured to increase data resolution, and a production mode, in which data resolution is increased based on the configured (trained) model. In the production mode, LR data set 110*l* (image, spectrum) is obtained through LR data acquisition instrument 105*l* (imager, spectrometer) and provided to processor 150. Processor 150 may convey LR data set 110*l* to ML engine 132, which may process the data in accordance with an ML model that has been previously trained, as described below, to increase the resolution in the data. The resolution-increased data set may be presented on user interface 140, where it can be analyzed by production personnel. In one embodiment, the resolution-increased data set is provided to process controller 134, by which the data are analyzed to determine whether a particular target process state has been attained. For example, analysis of the resolution-increased data set may reveal certain gaseous constituents in chamber 5 that are indicative of a process endpoint. At such an endpoint, process controller 134 may instruct or otherwise command a process transition or a cessation of all processes occurring in chamber 5.

Figure 2:
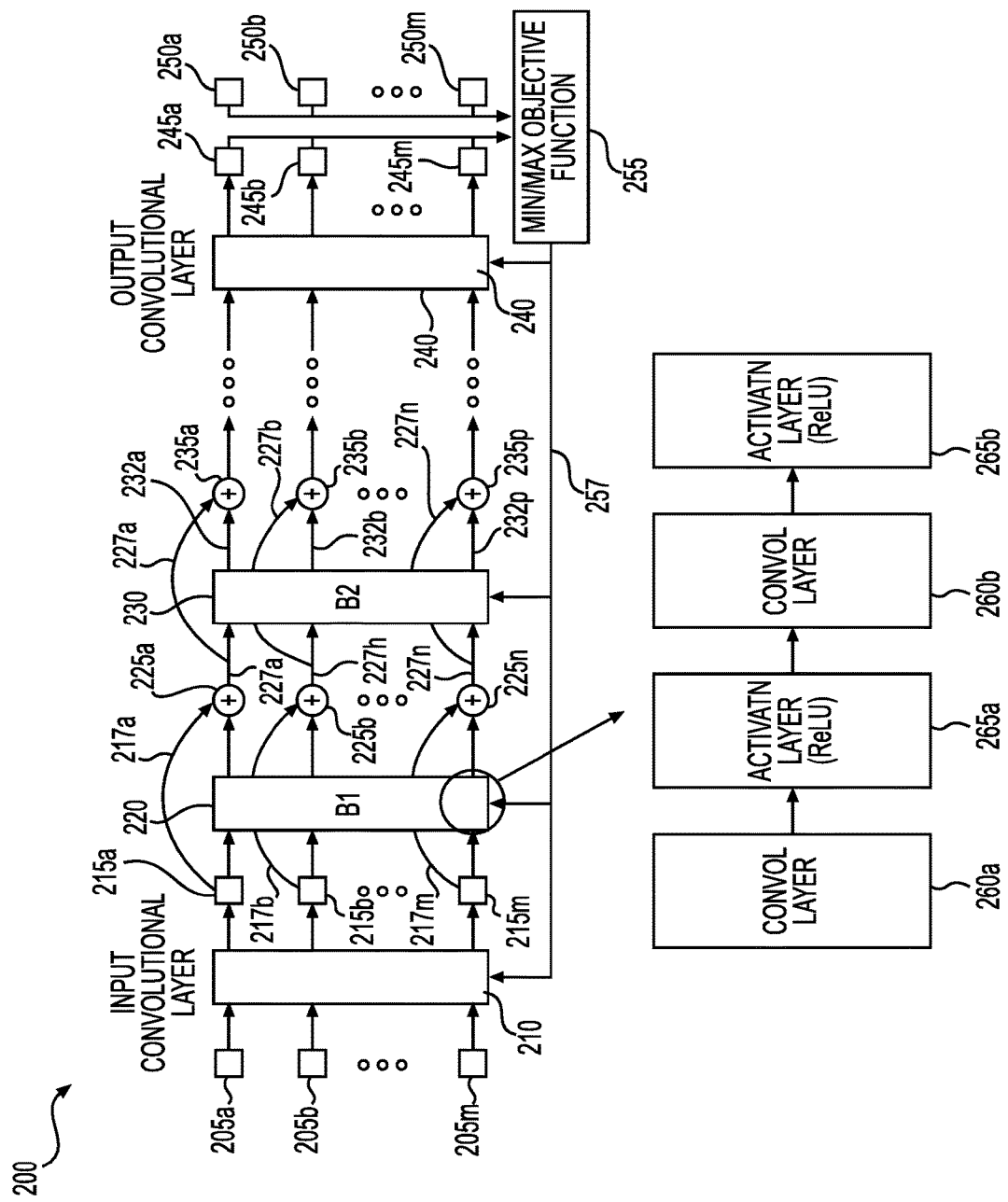
FIG. 2 is a schematic diagram of an artificial neural network (ANN) by which the present invention can be embodied.

FIG. 2 is a schematic diagram of an artificial neural network (ANN) 200 by which the present invention can be embodied. The present invention is not limited to particular ANN implementations as long as the goal of increasing data resolution in the output data is reached. In the example illustrated, ANN 200 is constructed or otherwise configured as a pyramidal residual neural network comprising an input convolutional layer 210, multiple residual blocks $B_1$-$B_K$, representatively illustrated at residual blocks 220 and 230, and an output convolutional layer 240. In ANN 200, 1) the size of internal feature maps or the number of feature map channels is gradually increased from ANN input to output, and 2) identity mappings are realized in shortcut paths that address gradient vanishing/exploding issues.

In the example embodiment of FIG. 2, LR data sets 205*a*-205*m*, representatively referred to herein as LR data set(s) 205, may be provided to input convolutional layer 210, which, among other possible operations, maps each data set 205 to a corresponding feature map 215*a*-215*m*, representatively referred to herein as feature map(s) 215. Feature maps 215 may be provided to residual block 220, which, as with all K residual blocks in ANN 200, may comprise a first convolutional layer 260*a*, a first activation layer 265*a*, a second convolutional layer 260*b* and a second activation layer 265*b*. Additionally, each feature map 215 may be provided to a summing node 225*a*-225*n*, representatively referred to herein as summing node(s) 225, in respective shortcut paths 217*a*-217*n*, representatively referred to herein as shortcut path(s) 217. Accordingly, the output of each summing node may be given by $$X_{k+1}=X_k+\psi\{\psi(X_k*W_k^{(1)})*W_k^{(2)}\},$$

where $X_k$ is the input to the $k^{th}$ residual block and $X_{k+1}$ is its output, $\psi$ is the activation function, (e.g., a rectified linear unit (ReLU)), * is the convolution operator and $W_k^{(1)}$ and $W_k^{(2)}$ are trainable convolutional kernels of the $k^{th}$ block. It should be noted that biasing terms have been omitted from the expression above. The feature maps generated by each convolutional layer may be given by $$\gamma_{k,j}=\Sigma_i\varphi_{k,i}*w_{k,i,j}++\beta_{k,j}\Omega,$$

where $\gamma_{k,j}$ is the output feature map of the $j^{th}$ convolutional layer of the $k^{th}$ residual block, $\varphi_{k,i}$ is the input feature map to the $i^{th}$ convolutional layer of the $k^{th}$ residual block, $W_{k,i,j}$ is the $i^{th}$ kernel of $W_k^{(j)}$, $\beta_{k,j}$ is a trainable bias term and $\Omega$ is a feature map sized matrix with all entries set to unity.

Feature maps 215 are processed by residual block 220 and conveyed to the next residual block, i.e., residual block 230, where they are similarly processed. However, each residual block may generate a feature map (and/or associated feature map channels) of greater dimension than that produced by a previous residual block. For example, the input to residual block 220 may comprise N channels 227*a*-227*n* and the output of residual block 220 may comprise P channels 232*a*-232*p*, where P>N. This dimensional mismatch may be overcome, for example, by zero-padding the shortcut connections, e.g., shortcut connections 227*a*-227*n* that bypass residual block 230.

As the data set progresses through ANN 200 and the dimensions thereof gradually increase, ever finer features may be discerned from residual block to residual block to effect an increase in resolution over the original data set 205. The processed feature maps proceed to output convolutional layer 240, where, among other optional processing operations, they are transformed to output data sets 245*a*-245*m*, representatively referred to herein as output data set(s) 245, If ANN 200 has been trained, output data sets 245 are provided to ANN-external mechanisms such as for data analysis or process control. If, however, ANN 200 is undergoing training, output data sets 245 are compared with respective high resolution training data sets 250*a*-250*m*, representatively referred to herein as HR training data set(s) 250, that have been chosen to correspond to the data contained in LR original data sets 205. That is, each LR original data set 205 is matched to a HR training data set 250 such that the same features are present in both, albeit at different resolutions. In training, the LR original data sets 205 are transformed to HR data sets in accordance with a randomly initialized function. The transformed HR data sets are suitably compared, such as by differencing, with the corresponding HR training data sets to determine an error measure. Using such error measure, ANN parameters, such as $W_k^{(j)}$ and $\beta_{k,j}$ described above, are modified to minimize (or maximize) an objective function, such as a training loss function. The modified parameters may be back-propagated through ANN 300, representatively illustrated at back-propagation channel 257, and the process may be repeated using the new parameters to produce other HR output data sets. The process iterates until a training goal has been reached, such as when the trainable network parameters converge or when no improvement in resolution is achieved.

LR data sets 205 may include LR spectrometer data and HR data sets 250 may include HR spectrometer data. In addition to the spectral data themselves, the HR and LR data sets may be labeled with information related to the observed process or feature associated with the spectral data. Such labeling may be used to isolate specific aspects of the HR/LR data sets or overlap certain aspects of the HR/LR data sets, depending on the type of model optimization needed to generate a predictable HR result based on an input of a random, but similar, LR data set. The HR/LR data sets may be collated into training pairs, which can include one or more combinations of HR/LR data sets, and are used to train ANN 200 based on identifying relationships between the HR/LR training pair. At a high level, the training is an iterative process in which the HR data produced according to the ML model are compared to the HR data sets for the purpose of optimizing the statistical relationships between the data sets using ML techniques.

In another embodiment, LR data sets 205 include image data that may be used to train an ML model. In this instance, LR data sets 205 are represented by an LR image and HR data sets 250 are represented by an HR image. The two images may be representative of the input data collected by the low and high resolution data acquisition instruments 105*l* and 105*h* as described above. In addition to the image data, the HR and LR data sets may be labeled with information related to the observed process or feature associated with the image data, such that the label information may be used to highlight differences or similarity between the data sets. The label information may be used to isolate specific aspects of the HR/LR data sets or overlap certain aspects of the HR/LR data sets, depending on the type of model optimization needed to generate a predictable HR result based on an input of a random, but similar, LR data set. The HR/LR data sets are collated into training pairs, which can include one or more combinations of HR/LR data sets, and are used to train ANN 200 using ML techniques based on identifying relationships between the HR/LR training pair, thus enabling the ML model to predict or create HR data set 245 using the LR data set 205.

It is to be understood that the training example provided above is but one of many possibilities for training an ANN of embodiments of the invention. In one embodiment, a data set generated by data acquisition instruments or by data generators may be partitioned into, for example, a training set used for training the learning technique, a validation set used for evaluating the model architecture, and a test set used to determine whether the model is suitably generalized beyond just the data set used for training. Those having skill in machine learning will recognize how to use such a partitioned data set without specific details being set forth herein, as well as other machine-learning techniques for implementing the present invention without departing from the spirit and intended scope thereof.

Returning once again to FIG. 1, system 100 may include a high resolution data generator 115 by which simulated data sets are generated for purposes of model training. In addition to image and spectral data, simulated spectral model data may be used to train ANN 200. However, the training pairs may be derived from low and high resolution simulations, which are estimations of LR and HR spectrometer data from spectrometers similar to the design illustrated in FIG. 3 below.

Figure 3:
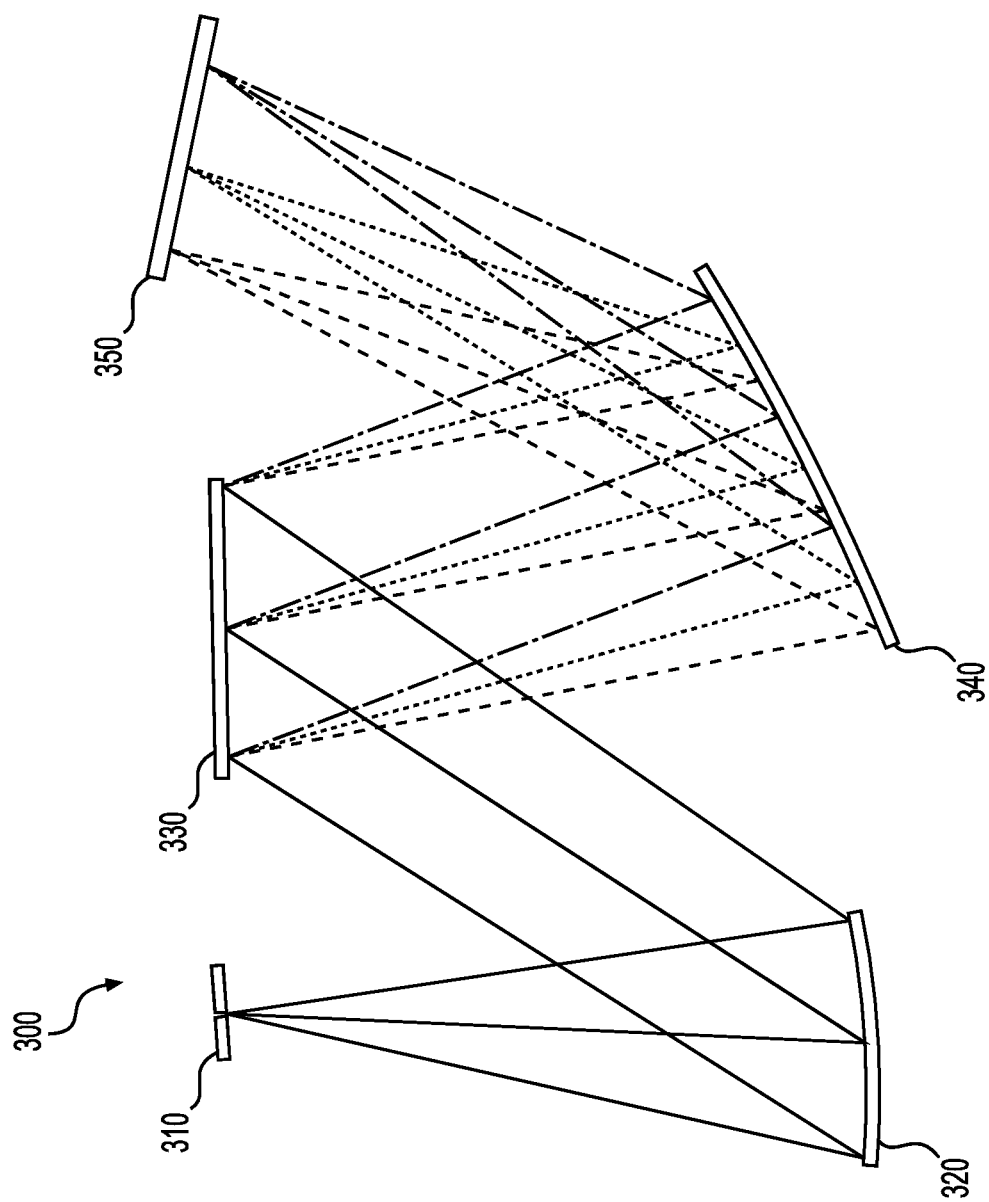
FIG. 3 is a schematic diagram of an example spectrometer with which the present invention can be embodied.

FIG. 3 is a schematic diagram of an example spectrometer 300 with which the present invention can be embodied. Spectrometer 300 may follow Czerny-Turner designs and comprises an entrance slit 310, a collimating mirror 320, a diffraction grating 330, a folding mirror 340 and an array detector 350. Light, including that generated in electro-chemical processes occurring in chamber 5 of FIG. 1, enters spectrometer 300 through entrance slit 310 and reflects off of collimating mirror 320 onto diffraction grating 330, where the impinging light is resolved into its spectral components. These components reflect off of folding mirror 340 and onto array detector 350, which generates an electrical signal that is indicative of the spectral content of the light under analysis. Essentially, a spectrally-resolved image of entrance slit 310 is produced on array detector 350 and such imaging may be simulated using various optical system design/analysis techniques implemented by HR data generator 115 of FIG. 1.

Figure 4:
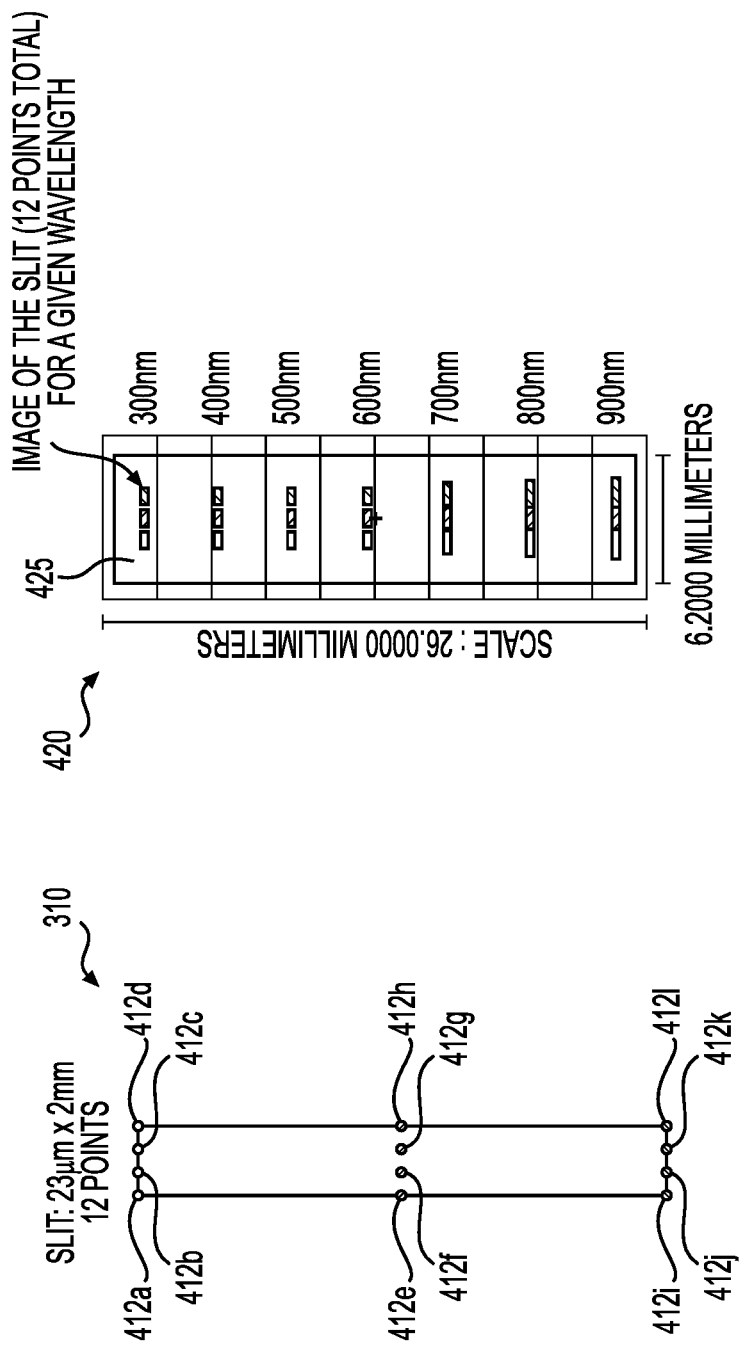
FIG. 4 is a schematic diagram of a spectrometer entrance slit and an image 420 thereof for simulating data in embodiments of the present invention.

FIG. 4 is a schematic diagram of entrance slit 310 and an image 420 thereof as produced by the optical system of spectrometer 300. In the illustrated embodiment, twelve (12) imaging points 412*a*-412*l*, representatively referred to herein as imaging points 412, on entrance slit 310 are selected for imaging. Through optical design/analysis techniques, imaging points 412 are carried onto image 420 produced on array detector 350, representatively illustrated at image region 425, for each of a number of selected wavelengths. It is to be noted that for a slit of a fixed size, the clarity of the imaged points 412 are affected by wavelength-dependent diffraction.

Figure 5:
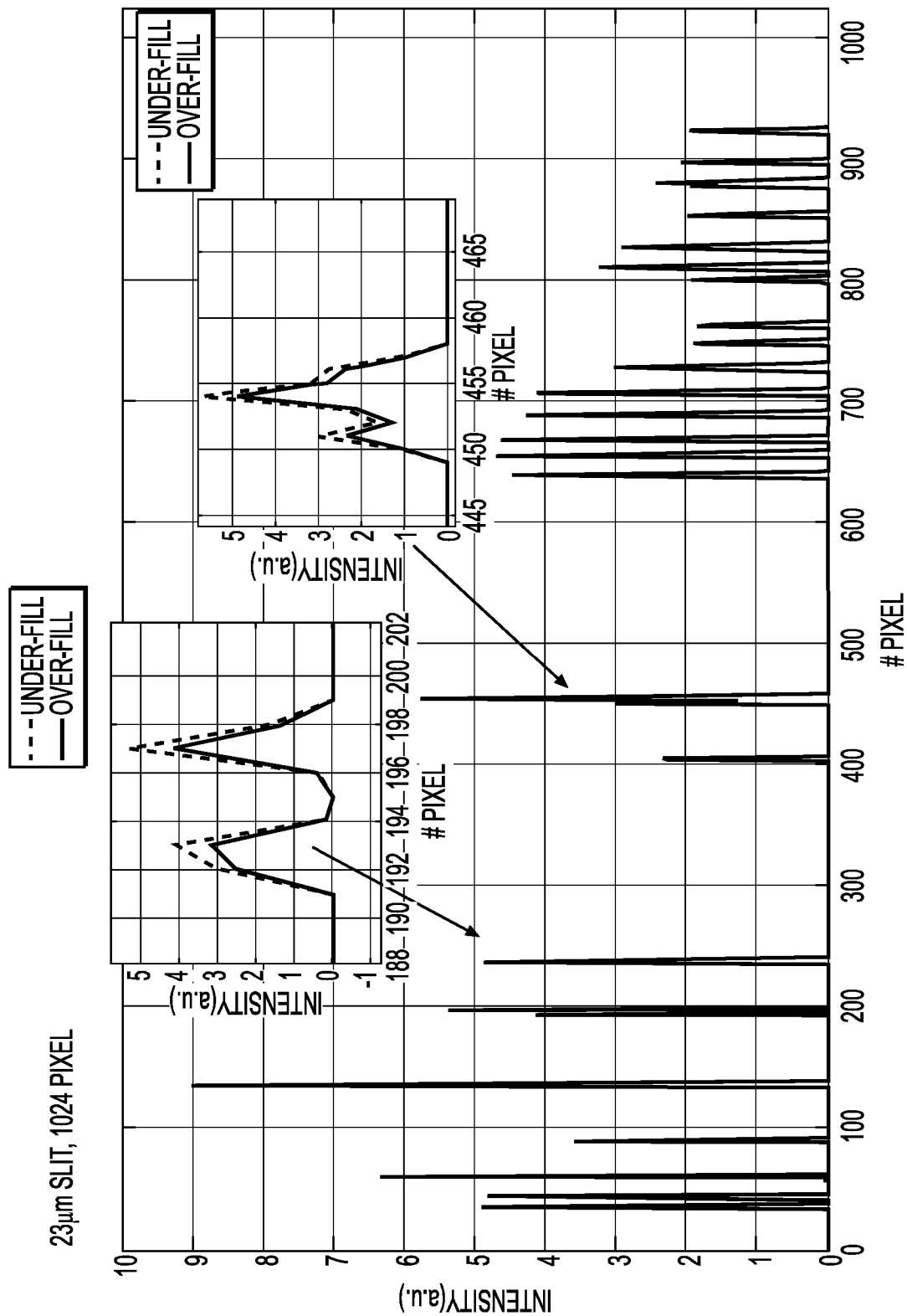
FIG. 5 is a graph of low resolution spectral data for underfill and overfill implementations of low resolution spectrometers used in embodiments of the present invention.

Model data may be generated for LR and HR spectrometers simulating light from a calibration lamp across a 300 nm to 900 nm spectrum with similar intensity across the spectrum. For purposes of demonstration, two different spectrometer designs were modeled for the LR and HR implementations to form two sets of training pairs. The LR data sets of the training pairs were modeled using a 23 um slit and a 1024 CCD and two additional LR data sets were generated by varying the grating placement relative to the slit. An underfill embodiment is representative of spectrometer design with a grating located closer to the slit than in the overfill embodiment. In this way, the LR training data sets cover a broader range of the LR spectrometer designs and/or capabilities and indicate performance (e.g., SNR) differences between the two different LR designs. For example, FIG. 5 illustrates the intensity differences between the LR spectrometer designs, wherein the underfill embodiment has a higher and sharper profile than the overfill embodiment.

Figure 6:
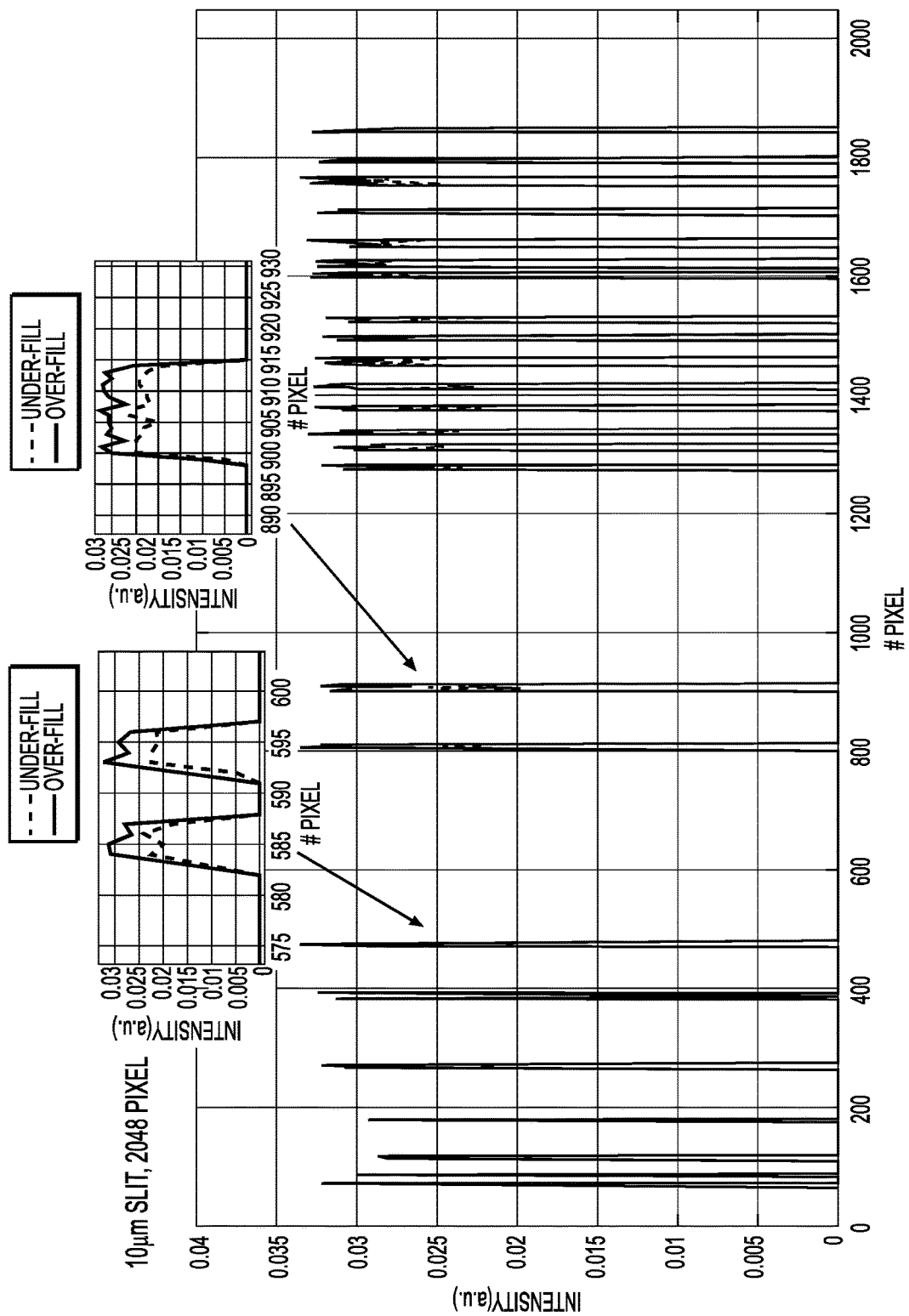
FIG. 6 is a graph of high resolution spectral data for underfill and overfill implementations of high resolution spectrometers used in embodiments of the present invention.

Overfill and underfill LR data sets may be paired with the corresponding overfill and underfill HR data sets. The example HR data sets were generated using a 10 um slit and 2048×256 pixel CCD with varying grating distance between the underfill and overfill data sets. FIG. 6 illustrates the differences between the HR spectrometer designs by highlighting the intensity differences. In contrast to the LR data set, the overfill data set resulted in a higher intensity signal compared to the underfill data set.

Once ANN 200 has been trained and validated, the model can be applied to applicable low resolution data sets to output estimated high resolution data corresponding to low resolution inputs. In contrast to the training method, the trained model will receive low resolution data, without the high resolution counterpart, and apply the data to the model to generate a corresponding high resolution output. The low resolution data may include, but is not limited to, images or spectral data related to semiconductor treatment processes or features on a semiconductor substrate.

Within the semiconductor space, deep-learning techniques may be applied to images ranging between macro-applications and micro-applications depending on the size of the feature being observed. In macro-applications, the observed feature may range between the entire substrate surface area to relatively large surface area regions to observe and monitor process trends at macro-level. For example, the large surface area regions may include the substrate bevel or edge exclusion area (<5 mm) which extends around the perimeter of the substrate. Likewise, the region adjacent to the edge exclusion area, extending up to 20 mm towards the center of the substrate, may be observed to monitor process performance proximate to the substrate edge, this region is known for process uniformity issues relative to the center of the substrate. Hence, comparing images of the center and edge of the substrate would be beneficial to observe or detect process excursions or to adjust processes to account for in-situ process non-uniformities or incoming process non-uniformities. In some instances, the center-to-edge relationship may be used to train low to high models depending on the application. In the macro-applications, the image capture devices may be digital or analog-to-digital systems which produce pixelated images for analysis. In one embodiment, the image capture device may be a CCD camera. In contrast, the micro-application embodiments are for observing relatively smaller features across the die or smaller area within the die when compared to the macro-applications. For example, the micro-application images may be of a scale to control and monitor processes with atomic layer precision. Atomic layer control of transistor gate structures (e.g., FinFET), components of the transistor (e.g., contact, isolation) or back end-of-line (BEOL) features (e.g., metal line pitch, via) is essential. In one embodiment, the micro-application images may be generated by a scanning electron microscope (SEM) which scans the substrate surface/feature with a focused beam of electrons which provide topographical and compositional information of the substrate. Alternatively, images may be generated using optical emission spectroscopy to monitor semiconductor processes, including, but not limited to, plasma treatments.

Figure 7:
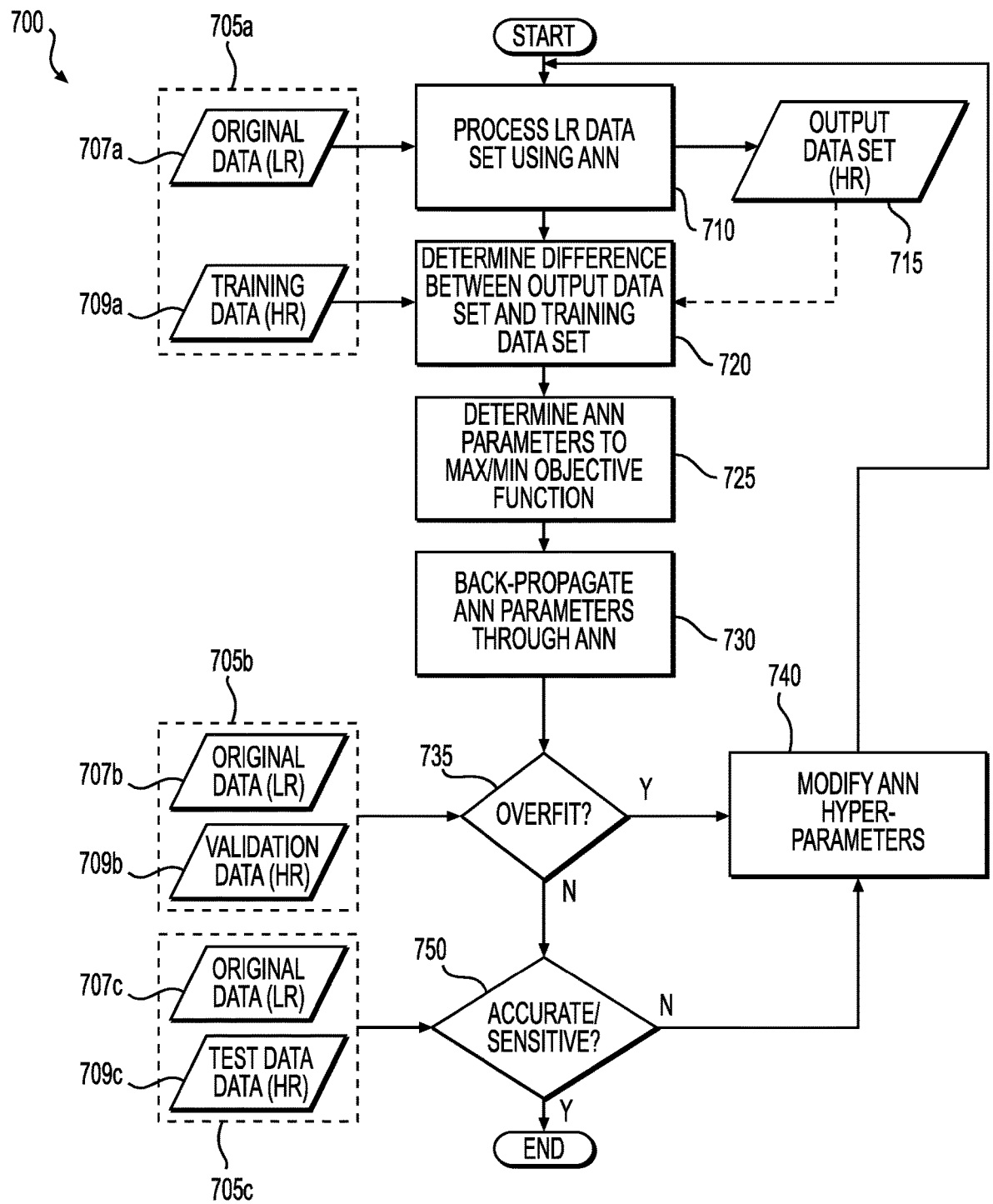
FIG. 7 is a flow diagram illustrating an exemplary training process by which the present invention can be embodied.

FIG. 7 is a flow diagram illustrating an exemplary training process 700 by which the present invention can be embodied. It is assumed that process 700 has access to a training corpus of data comprising matched pairs of LR and HR data sets, e.g., spectral data acquired from LR and HR spectrometers described herein. The training corpus may be suitably segmented or otherwise partitioned into a training volume 705a, a validation volume 705b and a test volume 705c. The partitioning of the corpus into training, validation and test volumes may follow known such techniques in the machine-learning arts. Indeed, process 700 represents in flow schematic form one of many model building/training paradigms that can be used in embodiments of the present invention, In the following description, the model paradigm refers to that described above with reference to FIG. 2. It is to be understood that the order of operations and data flow in FIG. 7 is for purpose of succinct explanation; other operational and data flows may also be used to implement model building/training.

As illustrated in FIG. 7, training volume 705a may comprise an LR original data set 707a, which may be obtained by a low resolution data acquisition instrument. In operation 710, LR data set 707a is processed in accordance with an ANN to produce HR output data set 715. In operation 720, a difference is determined between the HR output data set 715 and a training data set 709a obtained by a high resolution data acquisition instrument or simulated by a high resolution data generator. In operation 725, ANN parameters (weights, biases) are determined to maximize or minimize an objective function. In operation 730, the determined ANN parameters are back-propagated through the ANN.

Once training volume is exhausted, process 700 may transition to operation 735, whereby it is determined whether the model is overfitting the data or otherwise is generalizing to a given specification. For this purpose, validation volume 705b comprising an original LR data set 707b and an HR validation set 709b may be applied to the trained model in a manner similar to that described above with training volume 705a. This time, however, concentration is on the model's architecture, as represented through so-called hyperparameters, rather than its prediction efficiency. Accordingly, should it be found in operation 735 that the model does not generalize well, one or more hyperparameters thereof may be modified by operation 740. For example, a residual block of the model described above with reference to FIG. 2 may be removed or the order of operational blocks within each residual block may be revised, etc. Skilled artisans will recognize many techniques that can be applied to remediate overfitting in embodiments of the invention.

If it is determined in operation 735 that the model generalizes well, process 700 may transition to operation 750, whereby it is determined whether performance criteria are met by the trained model. For this purpose, test volume 705c comprising an original LR data set 707c and an HR test set 709c may be applied to the trained model in a manner similar to that described above with training volume 705a and validation volume 705b. This time, however, concentration is on the model's performance, as measured by specific performance criteria on accuracy, i.e., how close the predicted HR data set from the model is to the true HR data set that would be generated by actual measurement of observation, and sensitivity, i.e., the proportion of features in the HR predictions (through the model) that are correctly identified as such. If such criteria are met, process 700 may terminate. Otherwise, process 700 may transition to operation 740, whereby ANN hyperparameters are once again modified. Process 700 may then transition to operation 710 and continues from that point.

Figure 8:
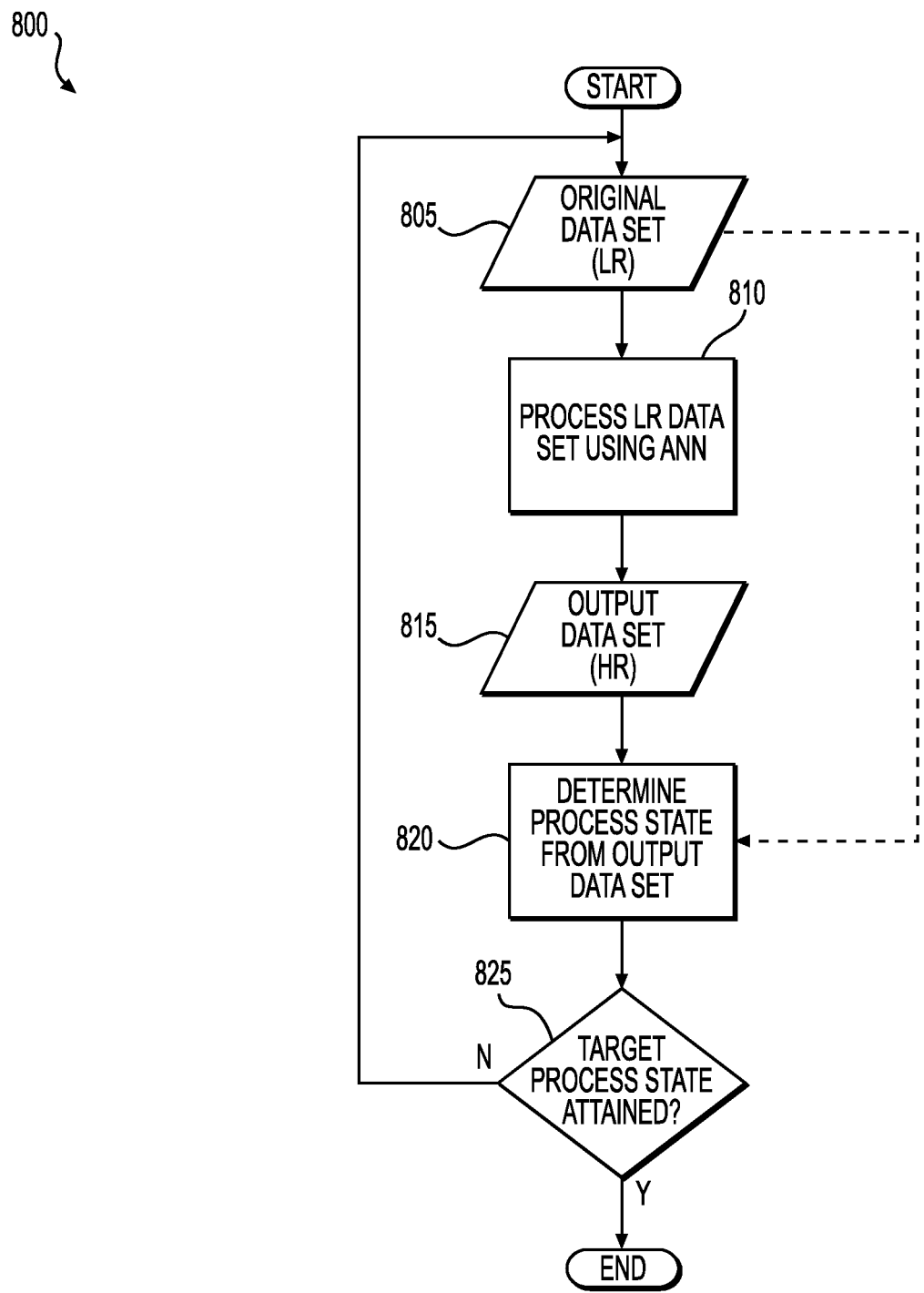
FIG. 8 is a flow diagram illustrating an exemplary production process by which the present invention can be embodied.

FIG. 8 is a flow diagram illustrating an exemplary production process 800 by which the present invention can be embodied. Production process 800 may be executed when the system is in production mode. At operation 810, LR data set 805 is used to predict a corresponding HR output data set 815, which is the output of the ANN described above. Process 800 may then transition to operation 820, whereby a process state is determined from HR output data set 815. If the target process state has been attained, as determined in operation 825, production process 800 terminates. If the target process state has not been attained, process 800 may transition to operation 810 with newly acquired LR data and continues from that point.

One embodiment includes a method for training a neural network to provide high resolution data from measured low resolution data. The training method may include storing, in a tangible computer-readable memory, a data set related to a semiconductor process or a feature on a semiconductor substrate within the processing chamber. The data set can include a rough (low resolution) data set being representative of the process or feature, and a detailed (high resolution) data set being representative of the process or feature, the detailed data set being different than the rough data set. In one example, the difference between the rough data set and the detailed data set includes a broader or narrower range of information about at least one characteristic of the process or feature. A computer processing device is used to assign training relationships between instances of the rough data set and the detailed data set, and neural network techniques are used to create a model to correlate the rough data set to the detailed set based, at least in part, on the training relationships and differences between the rough data set and the detailed data set. In one example, the detailed data set includes higher resolution data, compared to the rough data set, for the least one characteristic. The characteristic of the process may be a chemical composition of the process, a temperature of the process, a density of the process, and/or an electrical energy associated with the process. The characteristic of the process may include a distribution or profile of the chemical composition, the temperature, the density, and/or the electrical energy. The characteristic of the feature may include measured physical features such as a thickness, a width, a height, an orientation, roughness, flatness, angle, coverage, alignment, and/or a geometric profile of the feature.

The data set can include an image, spectral representation, or a module simulation of the process or feature. In one embodiment, the data set is based, at least in part, on images, spectral representations, and/or simulations of the feature or process. The neural network techniques may be based, at least in part, on convolutional neural network techniques, and the data set can be generated by a spectrometer. In some embodiments, the rough data set is generated by a rough spectrometer having a rough slit to allow light or energy into the rough spectrometer, and the detailed data set is generated by a detailed spectrometer including a detailed slit, which allows light or energy into the detailed spectrometer, where the detailed slit includes an opening or gap that is smaller than a corresponding opening or gap of the rough slit. The data set may also be generated by an image capture device, such as a charge-coupled device camera. Alternatively, the image capture device can include a microscope and a camera.

The training relationship assignments are based, at least in part, on a common element present during the collection of the rough data set and the detailed data set. The common element is a process condition of the semiconductor process or a feature type of the feature on the semiconductor substrate. The process condition can include temperature, pressure, chemical composition, gas flow rate, applied power, applied voltage, rotation speed, translation speed, liquid dispense rate, liquid dispense volume. The feature type may include a pattern in the substrate or a pattern on the substrate. In some examples, the feature type includes a thickness, a width, a height, a length, an orientation, roughness, flatness, angle, coverage, alignment, and/or a geometric profile of the feature. The feature type may also include a critical dimension of the feature, a surface area of the feature, an exposed surface area of the feature, overlap between features, distance between features, orientation between features, and/or alignment between features. The training relationship assignment of the method can include pairing a single rough data set and a single detailed data set collected during the process or on the feature One embodiment includes a method during which a data set related to a semiconductor process or a feature on a semiconductor substrate is stored in a tangible computer-readable memory. The data set may include a rough (low resolution) data set being representative of the process or feature. The rough data set is applied to a detailed resolution model based, at least in part, differences between a low resolution data set and high resolution data set related to the process or feature. A detailed (high resolution) data set being representative of the process or feature is generated using neural network techniques and the detailed data set is different than the rough data set, where the differences are based, at least in part, on a greater amount of information on at least one characteristic of the process or feature. The neural network techniques may be based, at least in part, on convolutional neural network techniques. The detailed data set may include higher resolution data, compared to the rough data set, for the least one characteristic, which may include a chemical composition of the process, a temperature of the process, a density of the process, and/or an electrical energy associated with the process, a distribution, uniformity, or profile of the chemical composition, the temperature, the density, and/or the electrical energy, a thickness, a width, a height, an orientation, roughness, flatness, angle, coverage, alignment, and/or a geometric profile of the feature.

The data set may include an image or spectral representation of the process or feature may be based, at least in part, on images or spectral representations of the feature or process. The data set may be generated by a spectrometer and, in certain embodiments, the rough data set is generated by a rough spectrometer comprising a rough slit to allow light or energy into the rough spectrometer and the detailed data set is generated by a detailed spectrometer comprising a detailed slit, which allows light or energy into the detailed spectrometer. The detailed slit may have an opening or gap being larger than a corresponding opening or gap of the rough slit.

The data set may also be generated by an image capture device, such as those comprising a charge-coupled device camera with or without a microscope.

The training relationship assignments may be based, at least in part, on a common element present during the collection of the rough data set and the detailed data set, where the common element may be a process condition of the semiconductor process, a feature type of the feature on the semiconductor substrate, temperature, pressure, chemical composition, gas flow rate, applied power, applied voltage, rotation speed, translation speed, liquid dispense rate, liquid dispense volume, further comprising sending the adjustments to the matching process chamber.

The feature type may be a pattern in the substrate, a pattern on the substrate, a thickness, a width, a height, a length, an orientation, roughness, flatness, angle, coverage, alignment, a geometric profile of the feature, a critical dimension of the feature, a surface area of the feature, an exposed surface area of the feature, overlap between features, distance between features, orientation between features, and/or alignment between features.

Memory circuitry 120 may be implemented by any quantity of any type of conventional or other memory or storage device, and may be volatile (e.g., RAM, cache, flash, etc.), or non-volatile (e.g., ROM, hard-disk, optical storage, etc.), and include any suitable storage capacity. Data in the system (e.g., images, spectra, model parameters, etc.) are stored in storage areas of memory circuitry 120.

Processor circuitry 130 may be, for example, one or more data processing devices such as microprocessors, microcontrollers, systems on a chip (SOCs), or other fixed or programmable logic, that executes instructions for process logic stored the memory. The processors may themselves be multi-processors, and have multiple CPUs, multiple cores, multiple dies comprising multiple processors, etc. Additionally, processor circuitry 130 may include dedicated machine-learning circuitry. Display rendering hardware may be a part of processor circuitry or may be, e.g., a separate Graphics Processor Unit (GPU).

User interface circuitry 140 may include any suitable display, screen or monitor capable of displaying information to a user, for example the screen of a tablet or the monitor attached to a computer workstation. User interface circuitry 140 may include input device(s), which may include any suitable input device, for example, a keyboard, mouse, trackpad, touch input tablet, touch screen, camera, microphone, remote control, speech synthesizer, or the like. Output device(s) may be included, for example, a speaker, headphone, sound output port, or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid state disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, a phase change memory storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, e.g., an object oriented programming language such as Java, Python, Smalltalk, C++ or the like, or a conventional procedural programming language, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Various functions of system 100 may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions and executed by processor circuitry 130 to produce a machine, such that the instructions create means for implementing the functions/acts specified in the flowchart and/or block diagram block or blocks.

The flowchart and block diagrams in the figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of any and all means or step plus function elements in the claims below are intended to include any structure, material, or act for performing the function in combination with other claimed elements as specifically claimed.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. An apparatus comprising:
a data acquisition instrument that observes a state of a semiconductor fabrication process and generates a data set accordingly, wherein the data acquisition instrument is a spectrometer that generates electromagnetic spectral data as the data set;
memory circuitry that stores:
the data set indicative of the state of the semiconductor fabrication process or of semiconductor structure fabricated thereby, features in the data set being discernable to an extent limited by a data resolution;
a machine-learning model comprising parameters having respective values assigned thereto as constrained by a model training process, the machine-learning model being a pyramidal residual convolutional neural network; and
a training data set containing features that are discernable to an extent limited by a training resolution that is greater than the data resolution; and
processor circuitry communicatively coupled to the memory circuitry and that:
generates an output data set from the data set in accordance with the machine-learning model such that features in the output data set are discernable to an extent limited by an output data resolution that is finer than the data resolution of the data set,
wherein the spectrometer includes an entrance slit and a grating, the training data set includes low resolution training data and high resolution training data that are acquired from the spectrometer, and the grating is located closer to the slit when the low resolution training data are acquired than when the high resolution training data are acquired.

2. The apparatus of claim 1, wherein each functional block includes a plurality of convolutional layers that convolve corresponding ones of the parameters with a feature map based on the data set.

3. The apparatus of claim 2, wherein each functional block includes a plurality of activation layers that limits passage of the convolved feature map to a subsequent layer in the functional block in accordance with an activation function.

4. The apparatus of claim 3, wherein the activation function is a rectified linear unit activation function.

5. The apparatus of claim 1, wherein the processor circuitry implements a process controller by which the semiconductor fabrication process is controlled based on the output data set.

6. The apparatus of claim 1, wherein the training data set comprises spectral data acquired from the spectrometer.

7. An apparatus comprising:
a data acquisition instrument that observes a state of a semiconductor fabrication process and generates a data set accordingly, wherein the data acquisition instrument includes a rough spectrometer and a detailed spectrometer that generate electromagnetic spectral data as the data set;
memory circuitry that stores:
the data set indicative of the state of the semiconductor fabrication process or of semiconductor structure fabricated thereby, features in the data set being discernable to an extent limited by a data resolution;
a machine-learning model comprising parameters having respective values assigned thereto as constrained by a model training process, the machine-learning model being a pyramidal residual convolutional neural network; and
a training data set containing features that are discernable to an extent limited by a training resolution that is greater than the data resolution, the training data set comprising the electromagnetic spectral data acquired from the spectrometer;
processor circuitry communicatively coupled to the memory circuitry and that:
generates an output data set from the data set in accordance with the machine-learning model such that features in the output data set are discernable to an extent limited by an output data resolution that is finer than the data resolution of the data set,
wherein the rough spectrometer has a rough slit, the detailed spectrometer has a detailed slit that includes an opening that is smaller than a corresponding opening of the rough slit, and the training data set includes low resolution training data that are generated by the rough spectrometer and high resolution training data that are generated by the detailed spectrometer.

8. A system for processing material for semiconductor fabrication comprising:
a chamber in which the materials are contained, the chamber including a port through which the semiconductor fabrication processing is monitored;
a data acquisition instrument communicatively coupled to the port of the chamber and that generates a data set indicative of a state of the semiconductor fabrication process, features in the data set being discernable to an extent limited by a data resolution of the data acquisition instrument, wherein the data acquisition instrument is a spectrometer that generates electromagnetic spectral data as the data set; and
processor circuitry communicatively coupled to the data acquisition instrument and that generates an output data set from the data set in accordance with a machine-learning model such that features in the output data set are discernable to an extent limited by an output data resolution that is finer than the data resolution of the data set, the machine-learning model being a pyramidal residual convolutional neural network and comprising parameters having respective values assigned thereto as constrained by a model training process, wherein the spectrometer includes an entrance slit and a grating, the training data set includes low resolution training data and high resolution training data that are acquired from the spectrometer, and the grating is located closer to the slit when the low resolution training data are acquired than when the high resolution training data are acquired.

9. The system of claim 8, wherein the spectrometer is optically coupled to the port of the chamber and generates spectra as the data set, an other data set being high resolution spectra having a finer resolution than that generated by the spectrometer, the spectrometer having a physical design that is characterized by a bandwidth and an optical throughput that are not diminished by way of processing the spectra by the machine-learning model.

10. The apparatus of claim 9, wherein the spectrometer includes the entrance slit and a detector array that define the bandwidth and the optical throughput.

11. The system of claim 8, wherein the training data set includes the spectral data acquired while a distance between the entrance slit and the detector array is varied.

12. The system of claim 9, wherein the process controller analyzes the high resolution spectra to determine the state of the semiconductor fabrication process and generates control signals that modify the semiconductor fabrication process to compel a different state thereof.

\* \* \* \* \*

UNITED STATES PATENT AND TRADEMARK OFFICE
CERTIFICATE OF CORRECTION

| | | |
|---|---|---|
| PATENT NO. | : 11,763,161 B2 | Page 1 of 1 |
| APPLICATION NO. | : 16/820032 | |
| DATED | : September 19, 2023 | |
| INVENTOR(S) | : Chen et al. | |

It is certified that error appears in the above-identified patent and that said Letters Patent is hereby corrected as shown below:

On the Title Page

Column 1, Item (72), in "Inventors", Line 3, delete "Pleasonton," and insert -- Pleasanton, --, therefor.

In the Claims

In Column 17, Claim 10, Line 21, delete "apparatus" and insert -- system --, therefor.

Signed and Sealed this
Twentieth Day of February, 2024

Katherine Kelly Vidal
*Director of the United States Patent and Trademark Office*